United States Patent
Kim et al.

(10) Patent No.: US 7,422,827 B2
(45) Date of Patent: Sep. 9, 2008

(54) NONAQUEOUS ELECTROLYTE

(75) Inventors: Young Gyu Kim, Yusung-gu (KR); Seung Kee Kim, Asanshi (KR); Min Seong Kim, Buk-gu (KR); Young Bae Roh, Gwangsan-gu (KR)

(73) Assignee: E Square Technologies Co., Ltd. (KR)

( * ) Notice: Subject to any disclaimer, the term of this patent is extended or adjusted under 35 U.S.C. 154(b) by 918 days.

(21) Appl. No.: 10/487,929

(22) PCT Filed: Oct. 19, 2001

(86) PCT No.: PCT/KR01/01770

§ 371 (c)(1),
(2), (4) Date: Aug. 30, 2004

(87) PCT Pub. No.: WO03/021707

PCT Pub. Date: Mar. 13, 2003

(65) Prior Publication Data

US 2005/0008941 A1      Jan. 13, 2005

(30) Foreign Application Priority Data

Sep. 6, 2001    (KR) .............................. 2001-54648

(51) Int. Cl.
*H01M 6/16*    (2006.01)
(52) U.S. Cl. .................. 429/336; 429/326; 429/330; 429/340
(58) Field of Classification Search ......... 429/324–331, 429/336, 340
See application file for complete search history.

(56) References Cited

U.S. PATENT DOCUMENTS 5,472,809 A * 12/1995 Perton et al. ................. 429/331

FOREIGN PATENT DOCUMENTS

| JP | 10-275614 | 10/1998 |
|---|---|---|
| JP | 10-289731 | 10/1998 |
| JP | 12-003725 | 1/2000 |
| JP | 12-082492 | 3/2000 |
| JP | 2000-082492 | * 3/2000 |
| JP | 12-164251 | 6/2000 |
| JP | 12-285961 | 10/2000 |
| JP | 12-294278 | 10/2000 |
| JP | 13-160417 | 6/2001 |

* cited by examiner

*Primary Examiner*—Patrick Ryan
*Assistant Examiner*—Alexander Chuang
(74) *Attorney, Agent, or Firm*—R. Neil Sudol; Henry D. Coleman; William J. Sapone

(57) ABSTRACT

Disclosed is a nonaqueous electrolyte for a lithium-ion secondary battery that contains an addictive for preventing destruction of a solid electrolyte interface (SEI) layer and hence decomposition of the electrolyte that may cause generation of a gas, thereby preventing swelling of the battery caused by the gas generated from the inside of the battery at a high temperature. More specifically, the present invention provides an electrolyte that includes, as an additive, 2-sulfobenzoic acid cyclic anhydride represented by the formula 1: The electrolyte contains the additive in an amount of 0.1 to 10.0 wt. %.

(I)

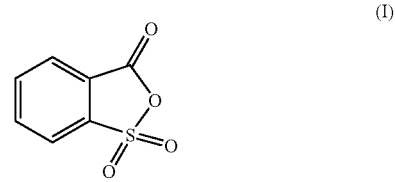

3 Claims, No Drawings

NONAQUEOUS ELECTROLYTE

TECHNICAL FIELD

The present invention relates to a nonaqueous electrolyte, and more particularly, to a nonaqueous electrolyte for a lithium-ion secondary battery that employs a carbonate solvent generally used as a solvent for lithium-ion batteries, a lithium salt as an electrolytic salt and an additive for preventing destruction of a solid electrolyte interface (SEI) layer and hence decomposition of the electrolyte that may cause generation of a gas, thereby preventing swelling of the battery caused by the gas generated from the inside of the battery at a high temperature.

BACKGROUND ART

The battery refers to a device for converting chemical energy generated from an electrochemical oxidation-reduction reaction of chemicals, which are contained in the battery, to electrical energy. According to its characteristic in use, the battery is classified into a primary battery that has to be disposed when the energy in the battery is used up, and a secondary battery that is rechargeable.

With a rapid progress of electronic, communication and computer industries, the related equipment has recently been miniaturized with lightweight and high performance and portable electronic appliances such as camcorder, mobile phone, notebook personal computer, etc. have been in popular use. There is thus a need for high performance lightweight and small-sized batteries that have a long use life with high reliability. In regard to this requirement, a lithium-ion battery is the very promising secondary battery.

Lithium (Li) is the most lightweight metal existing in the earth that has the highest electrical capacity per unit mass and a high thermodynamic oxidation potential, and can be used as a material for a high-voltage battery. Lithium is a positive electrode material most preferred for a battery that has to generate the maximum energy from a limited amount of chemicals, especially, for a secondary battery.

The lithium-ion secondary battery is composed of a lithium-mixed oxide as an anodic active material capable of deintercalation and intercalation of lithium ions, a carbon material or metal lithium as a cathode, and an electrolyte containing an adequate amount of a lithium electrolytic salt dissolved in a mixed organic solvent. Such a lithium-ion secondary battery has a high energy density, which is about 200% of a nickel-cadmium (Ni—Cd) battery and about 160% of a nickel-hydrogen (Ni—H) battery per weight, and about 170% of the Ni—Cd battery and about 105% of the Ni—H battery per density, and a low self-discharge rate of less than 5% per month at 20° C., which is no more than about ⅓ of the Ni—Cd or Ni—H battery. The lithium-ion secondary battery is also an environment-friendly battery that is free from heavy metals such as cadmium (Cd) or mercury (Hg) causing environmental contamination and rechargeable at least 500 times in a normal state so as to have a long use life.

Also, the lithium-ion secondary battery has an average discharge voltage of 3.6 to 3.7 V, which is advantageous to provide a very high power relative to another alkali batteries or Ni—MH or Ni—Cd batteries.

To generate such a high driving voltage, the lithium-ion secondary battery needs an electrolyte that is electrochemically stable in the charge/discharge voltage range of the lithium-ion battery, i.e., 2.75 to 4.2 V. Examples of such an electrolyte include a nonaqueous mixed solvent composed of mixed carbonates such as ethylene carbonate (EC), propylene carbonate (PC), dimethyl carbonate (DMC), ethylmethyl carbonate (EMC) or diethyl carbonate (DEC).

The electrolyte of such a composition is disadvantageous to have a high charge/discharge rate because of its strikingly low ion conductance relative to aqueous electrolytes used in Ni—MH or Ni—Cd battery.

For example, EC has a melting point of 36° C. with a disadvantage in low-temperature characteristic but is necessary for an electrical performance of the battery; PC is susceptible to decomposition during a charge/discharge of the battery in an artificial graphite most preferred as a negative electrode material; DMC that has a melting point of 3° C. and a boiling point of 90° C. is inferior in low-temperature characteristic as EC and high-temperature storage characteristic; DEC that has a melting point of less than −40° C. and a boiling point of about 126° C. is superior in performance but has a poor mixability with other solvents; EMC that has a melting point of less than 30° C. and a boiling point of about 107° C. is a most popular solvent but still unsatisfactory in temperature characteristic or the like.

These solvents have their own advantages and disadvantages and a combination of the solvents in an actual use makes a great difference in the performance of the battery. So, many attempts have been made to find out an optimized combination of the solvents to have a high performance and now EC/DMC/EMC, EC/EMC/DEC and EC/DMC/EMC/PC are widely used in the battery industry.

The high-temperature characteristic of the lithium-ion secondary battery is dependent on the type of an electrolytic salt. $LiPF_6$, $LiBF_4$, $LiClO_4$, $LiN(SO_2CF_3)_2$ and $LiN(SO_2CF_2CF_3)_2$, which are generally used as a solute of the electrolyte in the lithium-ion secondary battery, act as a source of lithium ions in the battery cell to enable the basic operation of the lithium-ion secondary battery. Among these electrolytic salts, $LiBF_4$ is known to be superior in thermal stability at high temperature.

The electrolyte for lithium-ion secondary battery that is composed of a solvent and an electrolytic salt reacts with carbon constituting the cathode to form a thin layer called SEI (Solid Electrolyte Interface) on the surface of the cathode. The SEI layer is an important factor that affects the migration of ions and charges to cause a change in the performance of the battery, and its properties are greatly dependent on the type of the solvents used in the electrolyte and the properties of the additives (See. Shoichiro Mori, Chemical properties of various organic electrolytes for lithium rechargeable batteries, J. Power Source 68 (1997)).

Now, a description will be given in further detail to the SEI layer formed on the surface of the cathode due to a reaction of the electrolyte and carbon that constitute the cathode.

During the initial charge of the lithium-ion secondary battery, lithium ions generated from the lithium oxide used as the positive electrode material migrate to carbon (crystalline or amorphous) electrode used as the negative electrode material and intercalated into the carbon electrode of the negative electrode material. At this time the ion, since it has high reactivity, reacts with the carbon to produce $Li_2CO_3$, $Li_2O$ and LiOH, which form a so-called SEI layer on the surface of the negative electrode material.

Once formed during the initial charge of the battery, the SEI layer prevents a reaction of lithium ions and the carbon negative electrode or another material during a repeated charge/discharge of the battery and acts as an ion tunnel that lets only the lithium ions pass between the electrolyte and the negative electrode.

Such an ion tunnel effect of the SEI blocks the migration of organic solvents, having a large molecular weight in which is dissolved the Lithium ion and flown together in the electrolyte, such as EC, DMC or DEC to the carbon negative electrode and the cointercalation of the organic solvents together with the lithium ions into the carbon negative electrode, thereby preventing the destruction of the carbon negative electrode. Thus the SEI layer reversibly maintains the amount of lithium ions during the subsequent charge/discharge of the battery by preventing a side reaction of the lithium ions and the carbon negative electrode or another material.

More specifically, the carbonaceous material of the negative electrode reacts with the electrolyte during the initial charge of the battery to form a passivation layer on the surface of the negative electrode and maintains a stable charge/discharge without further decomposition of the electrolyte (See. J. Power Sources, 51 (1994) 79-104). The quantity of electric charge used in formation of the passivation layer on the surface of the negative electrode is an irreversible volume that hardly involves in reversible reaction during the discharge of the battery. As such, the lithium-ion battery can maintain a stable life cycle without any irreversible reaction after the initial charge.

When the lithium-ion battery is stored at a high temperature in a fully charged state (for example, at 85° C. for 4 days after a 100% charge with 4.2 V), the electrochemical and heat energies increased with an elapse of time gradually destroy the SEI layer. In this case, the carbonate solvent in the electrolyte reacts with the surface of the negative electrode exposed due to the destruction of the SEI layer, causing a continuous side reaction.

Such a side reaction continuously generates a gas, such as $CO$, $CO_2$, $CH_4$ or $C_2H_6$, which depends on the types of the carbonate and the active material (See. J. Power Sources, 72 (1998) 66-70). The continuous generation of the gas irrespective of the type causes an increase in the internal pressure of the lithium-ion battery at a high temperature and swells the battery.

The formation of the SEI layer is dependent on the characteristic of an additive as well as the type of the electrolyte. When using no additive or an additive poor in characteristic, a non-uniform SEI layer is formed to cause the above-mentioned decomposition of the electrolyte, increasing the irreversible quantity of the active material of the battery and swelling the battery with generation of a gas at a high temperature. This disables set installation of the battery in equipment or apparatuses to reduce the capacity and use life of the battery and make realization of a lightweight battery impossible.

In regard to the function of the SEI layer, many studies have been made to enhance the physicochemical characteristics of the electrolyte by using a high-performance additive to the electrolyte and changing the reaction related to the formation of the SEI layer. For example, some documents disclose an addition of $CO_2$ to the electrolyte (Japanese Patent Laid-open No. 95-176323A), or an addition of a sulfide compound to the electrolyte (Japanese Patent Laid-open No. 95-320779A) to prevent decomposition of the electrolyte.

However, these studies cannot completely solve the problem related to destruction of the SEI layer at a high temperature in the lithium-ion battery. There is thus a need for an additive for forming a high-performance uniform SEI layer and reducing destruction of the SEI layer at a high temperature.

DISCLOSURE OF INVENTION

Accordingly, the present invention is directed to a nonaqueous electrolyte that substantially obviates one or more problems due to limitations and disadvantages of the related art.

An object of the present invention is to provide a nonaqueous electrolyte for a lithium-ion secondary battery that includes a carbonate solvent generally used for lithium-ion batteries, a lithium salt as an electrolytic salt, and an additive for preventing destruction of a solid electrolyte interface (SEI) layer and hence decomposition of the electrolyte that may cause generation of a gas, thereby preventing swelling of the battery caused by the gas generated from the inside of the battery at a high temperature.

To achieve these objects and other advantages, the lithium-ion battery according to the present invention uses at least one of $LiCoO_2$, $LiMnO_2$, $LiMn_2O_4$, $LiNiO_2$, or a composite compound ($LiM_{1x}M_{2y}O_2$) as an anodic active material, and crystalline or amorphous carbon or lithium as a cathodic active material, wherein $M_1$ and $M_2$ are a metal element; and x and y are a rational number from 0 to 2.

In the electrolyte of the present invention, the carbonate solvent is a mixed solvent comprising at least one carbonate selected from EC, DMC, EMC, PC and DEC, and the lithium salt is a solute of the electrolyte for a lithium-ion battery that comprises at least one selected from $LiPF_6$, $LiBF_4$, $LiClO_4$, $LiN(SO_2CF_3)_2$ and $LiN(SO_2CF_2CF_3)_2$ in a concentration of 0.5 to 2.0 M.

The additive used in the electrolyte of the present invention is a 2-sulfobenzoic acid cyclic anhydride (SBACA) compound represented by the formula 1:

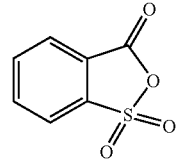

Formula 1

Preferably, the 2-sulfobenzoic acid cyclic anhydride (SBACA) compound is used in an amount of 0.1 to 10.0 wt. %.

Although not generally used in the manufacture of a battery, the additive is employed for the special purposes to enhance the characteristics, for example, use life, high discharge rate at low temperature, high-temperature stability, prevention of overcharge and swelling at high temperature, etc. The additive is used in the present invention in order to prevent decomposition of the solvent by the destruction of the SEI layer at a high temperature and thereby to enhance the performance of the battery.

It is to be understood that both the foregoing general description and the following detailed description of the present invention are exemplary and explanatory and are intended to provide further explanation of the invention as claimed.

BEST MODE FOR CARRYING OUT THE INVENTION

Hereinafter, the present invention will be described in detail by way of the following examples and comparative example, which are not intended to limit the scope of the present invention.

EXAMPLE 1

A lithium-ion battery was prepared according to the following procedures.

LiCoO$_2$ as an anodic active material, PVDF as a binder and carbon as a conductive agent were mixed at a predetermined weight ratio and dispersed in N-methyl-2-pyrrolydone to prepare slurry for an anode. The slurry was coated on a 15 µm thick aluminum foil and subjected to drying and rolling to form an anode.

Crystalline artificial graphite as a cathodic active material and PVDF as a binder were mixed at a predetermined weight ratio and dispersed in N-methyl-2-pyrrolidone to prepare slurry for a cathode. The slurry was coated on a 12 µm thick copper foil and subjected to drying and rolling to form a cathode.

The anode, the cathode and a 25 µm thick polyethylene (PE)/polypropylene (PP) separator were used to assemble an aluminum laminated lithium-ion cell(34 mm×48 mm×4.2 mm).

Subsequently, LiPF$_6$ as an electrolytic salt was dissolved in a solvent comprising EC, DMC and EMC (at a weight ratio of 1:1:1) to become 1.0M. To this solution was added 1.0 wt. % of 2-sulfobenzoic acid cyclic anhydride was added to prepare an electrolyte, which was used together with above cell to fabricate a battery.

EXAMPLE 2

The procedures were performed in the same manner as described in Example 1, excepting that 2.0 wt. % of 2-sulfobenzoic acid cyclic anhydride was added to prepare the electrolyte.

EXAMPLE 3

The procedures were performed in the same manner as described in Example 1, excepting that 5.0 wt. % of 2-sulfobenzoic acid cyclic anhydride was added to prepare the electrolyte.

COMPARATIVE EXAMPLE

The procedures were performed in the same manner as described in Example 1, excepting that no additive was used in the electrolyte.

EXPERIMENTAL EXAMPLE 1

Thickness Change Test at High Temperature

The batteries prepared in the above examples were charged under a constant current-constant voltage (CC-CV) condition using a current of 120 mA and a charge voltage of 4.2 V, and kept for one hour. The batteries were discharged to 2.5 V with a current of 120 mA and kept for one hour.

After removal of a gas generated, the batteries were again charged under a CC-CV condition using a current of 120 mA and a charge voltage of 4.2 V, and kept for one hour. The batteries were discharged to 2.5 V with a current of 120 mA and kept for one hour.

This procedure was performed twice and the batteries were charged with a current of 300 mA and a charge voltage of 4.2 V for 3 hours.

To determine the change in the thickness of the batteries at high temperature, the charged batteries were measured in regard to the thickness and kept at 85° C. in a hot chamber for 4 days. After 4 hours and 96 hours, the measurements of the thickness change rate were performed again. The results of the measurements are presented in Table 1.

TABLE 1

| Electrolyte | Measurement time | |
|---|---|---|
| | 4 hours | 96 hours |
| Comparative Example | 20.1% | 60.7% |
| Example 1 | 5.9% | 23.6% |
| Example 2 | 3.5% | 17.3% |
| Example 3 | 2.3% | 15.9% |

As can be seen from Table 1, the swelling of the battery at a high temperature after a full charge was highly prevented in the embodiments of the present invention that used 2-sulfobenzoic acid cyclic anhydride as an additive, compared to the comparative example using no additive.

EXPERIMENTAL EXAMPLE 2

Capacity Maintaining Performance Test

To measure the capacity maintaining performance of the batteries, the batteries kept at a high temperature of 85° C. for 4 days were measured in regard to the discharge capacity. The results are presented in Table 2.

TABLE 2

| Residual discharge capacity after storage at 85° C. | |
|---|---|
| Electrolyte | Discharge Capacity |
| Comparative Example | 78.0% |
| Example 1 | 81.3% |
| Example 2 | 78.5% |
| Example 3 | 75.8% |

The measurements showed that the examples of the present invention using 2-sulfobenzoic acid cyclic anhydride as an additive were equivalent or superior to the comparative example using no additive in regard to discharge capacity after a long-term storage at a high temperature.

As described above, the electrolyte for lithium-ion secondary battery according to the present invention contains 2-sulfobenzoic acid cyclic anhydride as an additive, which forms a uniform SEI layer of high performance to enhance the performance of the battery and prevents destruction of the SEI layer at a high temperature to reduce swelling of the battery caused by a gas generated from decomposition of the electrolyte.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A nonaqueous electrolyte for a lithium-ion secondary battery which uses at least one of $LiCoO_2$, $LiMnO_2$, $LiMn_2O_4$, $LiNiO_2$, or a composite compound, $LiM_{1x}M_{2y}O_2$ as an anodic active material, and crystalline or amorphous carbon or lithium as a cathodic active material, wherein $M_1$ and $M_2$ are a metal element; and x and y are a rational number from 0 to 2, the electrolyte comprising:

a mixed solvent comprising at least one carbonate solvent, as a solvent;

at least one lithium salt selected from $LiPF_6$, $LiBF_4$, $LiClO_4$, $LiN(SO_2CF_3)_2$ and $LiN(SO_2CF_2CF_3)_2$, as an electrolytic salt; and 2-sulfobenzoic acid cyclic anhydride as an additive, represented by the formula 1:

Formula 1

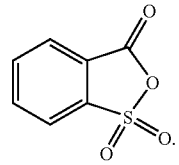

2. The electrolyte as claimed in claim 1, wherein the 2-sulfobenzoic acid cyclic anhydride as the additive is used in an amount of 0.1 to 10.0 wt. %.

3. The electrolyte as claimed in claim 1, wherein the lithium salt as an electrolytic salt has a concentration of 0.5 to 2.0 M.

* * * * *